US009457739B2

(12) United States Patent
Yamaguchi et al.

(10) Patent No.: US 9,457,739 B2
(45) Date of Patent: Oct. 4, 2016

(54) NONWOVEN ACOUSTIC SLEEVE AND METHOD OF CONSTRUCTION THEREOF

(71) Applicant: Federal-Mogul Powertrain, Inc., Southfield, MI (US)

(72) Inventors: Hiroki Yamaguchi, Kanagawa (JP); Maeda Takuto, Kanagawa (JP); Ritesh Mehbubani, Royesford, PA (US); Aleksandr Ilyin, Chester Springs, PA (US); John E. Burdy, Elverson, PA (US)

(73) Assignee: Federal-Mogul Powertrain, Inc., Southfield, MI (US)

(*) Notice: Subject to any disclaimer, the term of this patent is extended or adjusted under 35 U.S.C. 154(b) by 0 days.

(21) Appl. No.: 14/952,553

(22) Filed: Nov. 25, 2015

(65) Prior Publication Data

US 2016/0144805 A1    May 26, 2016

Related U.S. Application Data

(60) Provisional application No. 62/084,665, filed on Nov. 26, 2014.

(51) Int. Cl.
| | |
|---|---|
| *B60R 13/08* | (2006.01) |
| *B32B 1/08* | (2006.01) |
| *B29C 65/08* | (2006.01) |
| *B32B 5/26* | (2006.01) |
| *B32B 5/02* | (2006.01) |

(Continued)

(52) U.S. Cl.
CPC .......... *B60R 13/0884* (2013.01); *B29C 65/002* (2013.01); *B29C 65/08* (2013.01); *B32B 1/08* (2013.01); *B32B 5/022* (2013.01); *B32B 5/028* (2013.01); *B32B 5/26* (2013.01); *B60R 13/0846* (2013.01); *B29L 2031/30* (2013.01); *B32B 2307/102* (2013.01); *B32B 2307/546* (2013.01); *B32B 2457/00* (2013.01); *B32B 2605/08* (2013.01); *B32B 2605/18* (2013.01)

(58) Field of Classification Search
CPC .......... B60R 13/0884; B60R 13/0846; H02G 3/0481; B29C 65/08; B29C 65/002; B32B 5/022
USPC ................................. 181/207, 294; 174/68.3
See application file for complete search history.

(56) References Cited

U.S. PATENT DOCUMENTS

| | | |
|---|---|---|
| 3,660,890 A | 5/1972 | Terry |
| 3,786,226 A | 1/1974 | Terry |

(Continued)

OTHER PUBLICATIONS

International Search Report, mailed Mar. 3, 2016 (PCT/US2015/062757).

*Primary Examiner* — Jeremy Luks
(74) *Attorney, Agent, or Firm* — Robert L. Stearns; Dickinson Wright PLLC

(57) ABSTRACT

A flexible, resilient, non-woven acoustic sleeve and method of construction thereof is provided. The sleeve has an elongate nonwoven layer with opposite sides bonded to one along a lengthwise extending bonded seam, thereby forming a circumferentially enclosed inner cavity sized for receipt of an elongate member therethrough. The sleeve further includes a generally smooth inner scrim layer bonded to an inner surface of the nonwoven layer, wherein the smooth inner scrim layer forms a circumferentially continuous, smooth inner surface bounding the cavity, with the material of the inner scrim layer forming at least a portion of the bonded seam.

8 Claims, 2 Drawing Sheets

(51) Int. Cl.
*B29C 65/00* (2006.01)
*B29L 31/30* (2006.01)

(56) References Cited

U.S. PATENT DOCUMENTS

| | | |
|---|---|---|
| 3,800,834 A | 4/1974 | Terry |
| 4,410,014 A | 10/1983 | Smith |
| 5,767,024 A | 6/1998 | Anderson et al. |
| 5,947,158 A | 9/1999 | Gross et al. |
| 6,156,973 A | 12/2000 | Ushiyama et al. |
| 6,329,602 B1 | 12/2001 | Ushiyama et al. |
| 6,877,472 B2 | 4/2005 | Lepoutre |
| 8,808,482 B2 | 8/2014 | Qi |
| 2014/0224576 A1 | 8/2014 | Staudt |
| 2014/0255627 A1* | 9/2014 | Yamaguchi ......... H02G 3/0481 428/34.1 |
| 2014/0272343 A1 | 9/2014 | Mehbubani et al. |

* cited by examiner

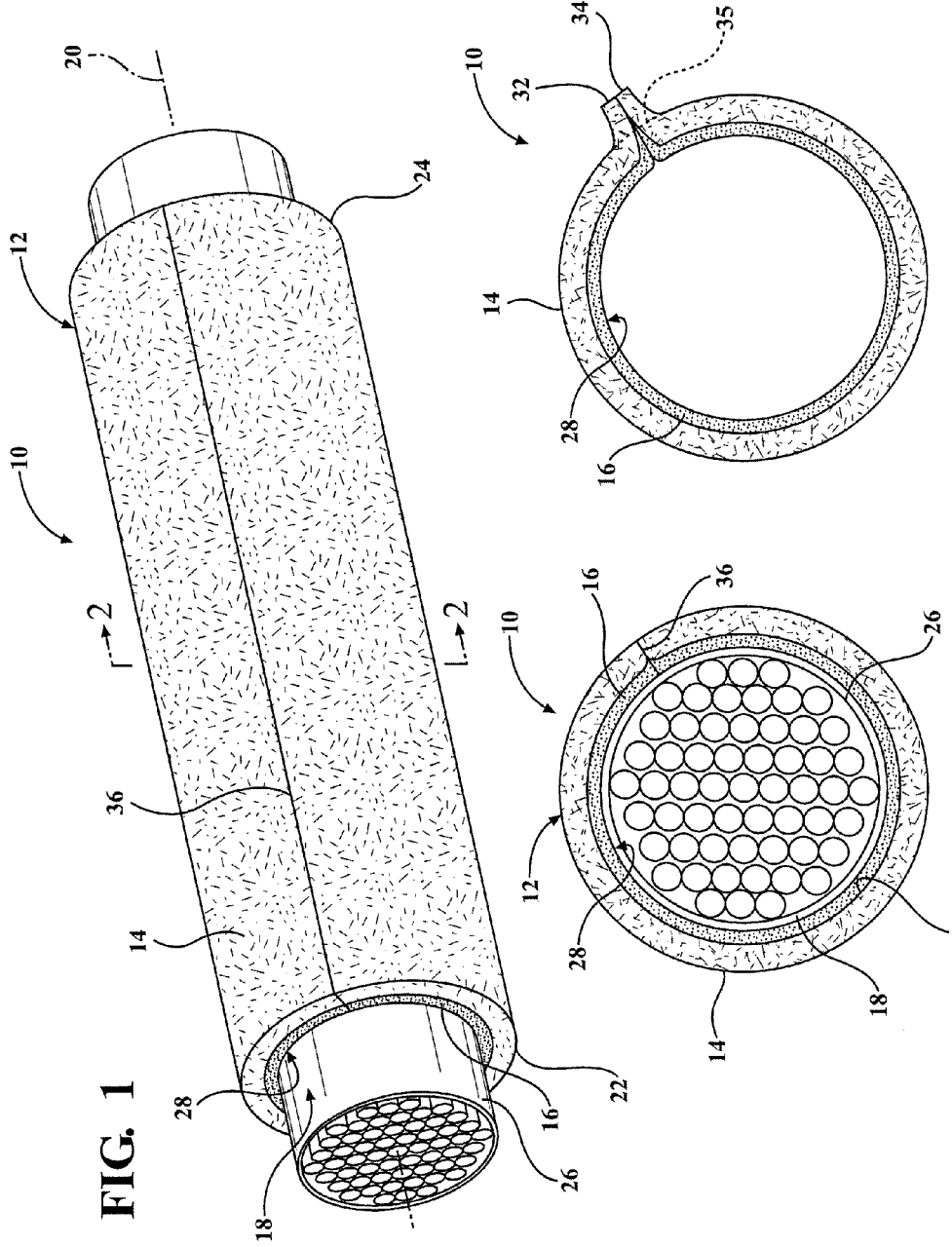

NONWOVEN ACOUSTIC SLEEVE AND METHOD OF CONSTRUCTION THEREOF

CROSS-REFERENCE TO RELATED APPLICATION

This application claims the benefit of U.S. Provisional Application Ser. No. 62/084,665, filed Nov. 26, 2014, which is incorporated herein by reference in its entirety.

BACKGROUND OF THE INVENTION

1. Technical Field

This invention relates generally to sleeves for protecting elongate members, and more particularly to nonwoven acoustic protection sleeves for receiving elongate members therein and to their method of construction.

2. Related Art

It is known that wires and wire harnesses carried in tubular sleeves in vehicles, such as in automobiles, aircraft or aerospace craft, can produce undesirable noise while the vehicle is in use. The noise typically stems from the wires or harness vibrating against adjacent components, wherein the vibration results from vibrating components in the vehicle, and in the case of automotive vehicles, movement of the vehicle over a ground surface. As such, it is customary to spirally wrap wires and wire harnesses with sound masking tape to reduce the potential for noise generation. Unfortunately, applying tape is labor intensive, and thus, costly. In addition, the appearance of the tape can be unsightly, particularly over time as the tape wears. Further, in service, tape can provide difficulties in readily accessing the wound wires.

Other than applying tape, it is also known to provide tubular acoustic protection in the form of woven, braided or knitted fabric sleeves about the wires. Although these fabric sleeves generally prove useful, they can be relatively costly due to manufacturing processes and yarn materials used to construct the sleeves.

It is further known to provide tubular acoustic protection in the form of a tubular assembly including solid extruded PVC tubing that is subsequently wrapped with polyurethane foam after disposing the wires through the PVC tubing. The PVC tubing provides the structural support to the assembly and the polyurethane foam provides the acoustic dampening to the assembly. Although this type of assembly can prove useful in routing wires and suppressing noise generation, it is a costly solution from both a material content and installation standpoint. Further, installation can be troublesome, if not impossible, as a result of not being able to route the rigid PVC of the tubular assembly about tight corners. Further, although the outer polyurethane foam is provided to suppress noise, the hard inner surface of the PVC tubing can result in the generation of noise, thereby countering the ability of the tubular assembly to optimally suppress noise.

An acoustic sleeve manufactured according to the present invention overcomes or greatly minimizes any limitations of the prior art described above, and also provides enhanced potential to suppress noise generation by elongate members carried in the sleeves.

SUMMARY OF THE INVENTION

One aspect of the invention provides a flexible, resilient, non-woven acoustic sleeve for routing and protecting elongate members and suppressing noise generation from resulting due to vibration or other types of movement of the elongate members. The sleeve has an elongate nonwoven layer with opposite sides that are bonded to one along a lengthwise extending bonded seam, thereby forming a circumferentially enclosed inner cavity sized for receipt of an elongate member therethrough. To facilitate disposing the elongate member through the cavity without snagging or otherwise catching a portion of the elongate member on fibrous material of the nonwoven layer, the sleeve further includes a generally smooth inner scrim layer bonded to an inner surface of the nonwoven layer, wherein the smooth inner scrim layer forms a circumferentially continuous, smooth inner surface bounding the cavity.

The material forming the nonwoven layer of the sleeve is an engineered plastics material, preferably formed from polyester, such as polyethylene terephthalate (PET) or polypropylene (PP), for example. The nonwoven layer is constructed having a suitable thickness of mechanically intertwined fibers that act both as an acoustic dampener, while also acting to provide structural support to maintain the nonwoven layer with a generally circular cross-sectional shape, thereby aiding in inserting an elongate member through the cavity of the sleeve.

In accordance with another aspect of the invention, the bonded seam is formed at least in part with fused material of the nonwoven layer.

In accordance with another aspect of the invention, the fibrous material in the nonwoven layer contains heat-bonded material to maintain the cavity having a generally circular cross-sectional configuration, thereby facilitating installation of the elongate member through the cavity.

Further aiding in installation of the elongate member through the cavity of the sleeve is the presence of the inner scrim layer. The inner scrim layer forms a relatively smooth, circumferentially continuous inner surface that is directly exposed to the cavity, wherein relatively smooth surface is as compared to the surface of nonwoven layer to which the inner scrim layer is attached. With the surface of the inner scrim layer being relatively smooth, the elongate member is prevented from getting hung up or otherwise snagged against the inner surface of the inner scrim layer while installing the elongate member through the cavity.

The inner scrim layer is provided at least in part as a polymeric fibrous material, such as polyethylene, by way of example. The inner scrim layer can be provided as a flat bonded or spun bonded scrim, for example, wherein the nonwoven structure of the inner scrim layer, aside from forming a relatively snag free, smooth inner surface, aids in noise suppression by providing a relatively soft, cushioning inner surface that may contact the elongate member during movement of the elongate member within the cavity.

In accordance with another aspect of the invention, the bonded seam is formed at least in part with fused material of the inner scrim layer, thereby enhancing the bond strength of the bonded seam.

Another aspect of the invention includes a method of constructing a resilient, non-woven acoustic sleeve for routing and protecting an elongate member and suppressing noise generation from resulting due to vibration or other types of movement of the elongate member within the sleeve. The method includes forming a circumferentially continuous tubular wall having a nonwoven outer layer and an inner scrim layer bounding an inner cavity of the tubular wall. The method includes bonding regions of the nonwoven layer and the inner scrim layer to one another to form a bonded seam extending lengthwise between opposite ends of the sleeve. Then, upon forming the circumferentially continuous wall, the method further includes heat-setting the nonwoven layer by melting at least some fibrous material within the nonwoven layer, thereby providing the tubular wall with a resilient structure and forming the inner cavity through which the elongate member is disposed with a generally circular shape in cross-section.

In accordance with another aspect of the invention, the method of construction further includes forming the bonded seam immediately adjacent opposite lengthwise extending edges of the nonwoven layer and inner scrim layer and trimming off the opposite lengthwise extending edges of the nonwoven layer and inner scrim layer to form the tubular wall having a generally cylindrical shape.

In accordance with another aspect of the invention, the method of construction further includes forming the bonded seam at least in part by fusing material of the nonwoven layer with itself.

In accordance with another aspect of the invention, the method of construction further includes forming the bonded seam at least in part by fusing material of the scrim layer with itself.

In accordance with another aspect of the invention, the method can include constructing the sleeve in a continuous, in-line process, and cutting individual lengths of the finished sleeve upon forming the bonded seam.

Accordingly, non-woven sleeves produced in accordance with the invention act as an acoustic barrier for elongate members contained within the sleeves, and thus, act to prevent the transmission of undesirable sound waves. The sleeves can be constructed to accommodate virtually any package size by adjusting sizes of the non-woven fabric and inner scrim layer from which the sleeves are formed. Further, sleeves manufactured in accordance with the invention are flexible in 3-D without affecting their protective strength or their acoustic barrier effectiveness, thereby allowing the sleeves to be routed as needed throughout relatively tight spaces.

BRIEF DESCRIPTION OF THE DRAWINGS

These and other objects, features and advantages will become readily apparent to those skilled in the art in view of the following detailed description of presently preferred embodiments and best mode, appended claims, and accompanying drawings, in which:

FIG. 1 is a schematic perspective view of a flexible, resilient acoustic nonwoven sleeve constructed according to one presently preferred embodiment of the invention carrying elongate members therein;

FIG. 2 is a cross-sectional view of the sleeve of FIG. 1 taken generally along line 2-2;

FIG. 3 is an end view of the sleeve of FIG. 1 shown in an intermediate stage of construction.

DETAILED DESCRIPTION OF PREFERRED EMBODIMENTS

Figure 4:
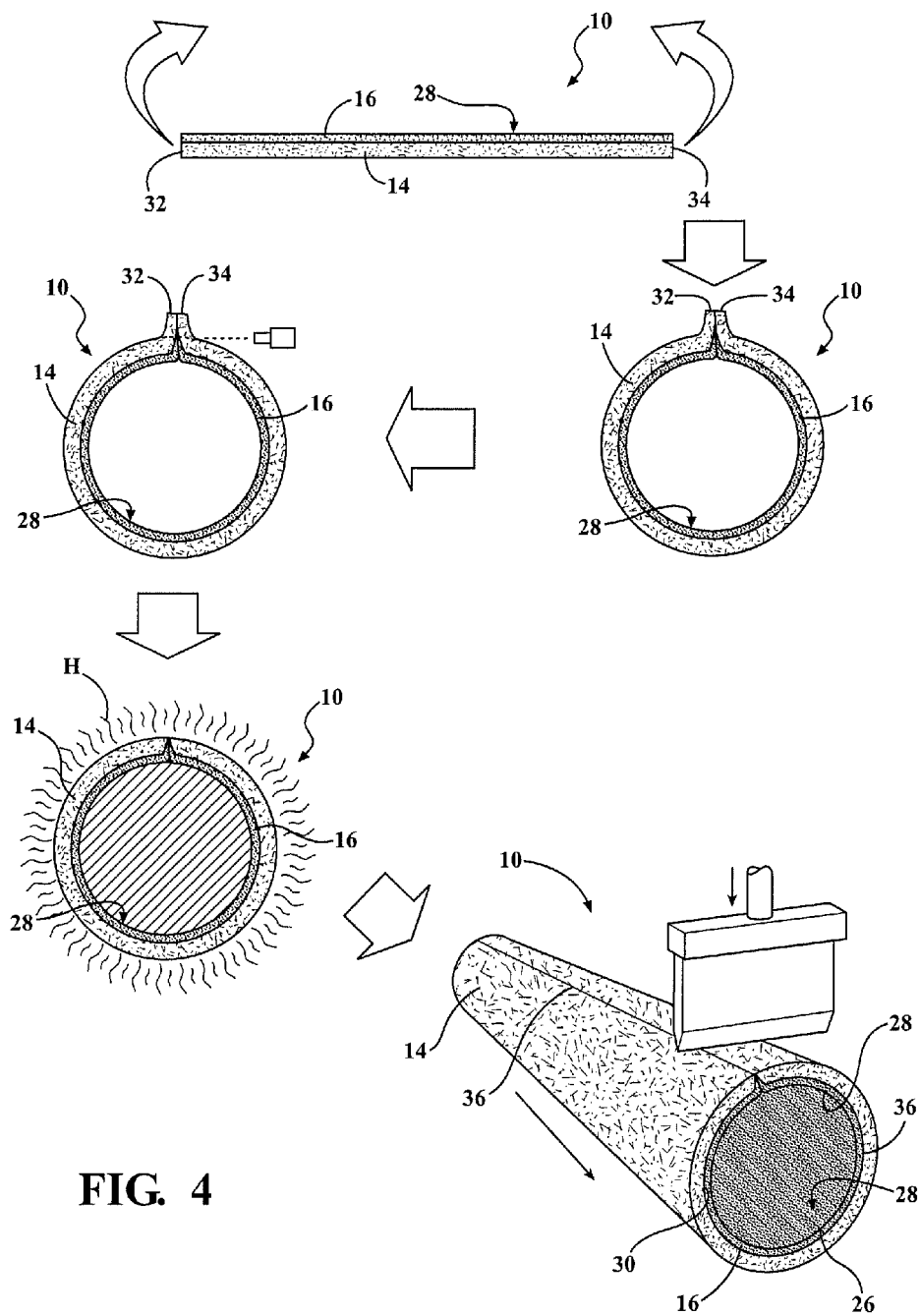
FIG. 4 is a process flow diagram illustrating one method of constructing a sleeve in accordance with the one aspect of the invention.

Referring in more detail to the drawings, FIG. 1 shows a non-woven sleeve 10 constructed in accordance with one presently preferred embodiment of the invention. The sleeve 10 has a circumferentially continuous wall 12 constructed from a lamination of an outer non-woven layer 14 and an inner scrim layer 16, wherein the laminated wall 12 is formed to define a circumferentially enclosed inner cavity 18 extending along a central longitudinal axis 20 between opposite ends 22, 24 of the sleeve 10. The cavity 18 is maintained or substantially maintained having a generally circular shape in cross-section taken transversely to the axis 20 as a result of the outer nonwoven layer 14 being heat-set via exposure to a suitable heat source (H, FIG. 4) during construction, and thus, an elongate member 26, such as a tube, wires or a wire harness 26, for example, can be readily disposed through the generally circular cavity 18. To further facilitate disposing the elongate member 26 through the cavity 18 without snagging or otherwise catching a portion of the elongate member 26, such as an electrical connector, for example, on fibrous material of the outer nonwoven wall 14, the cavity 18 is directly bounded by a relatively smooth, in comparison to that of the surface finish of the nonwoven wall 14, circumferentially continuous inner surface 28 of the inner scrim layer 16.

The outer non-woven material forming the nonwoven layer 14 is an abrasion resistant, flexible, acoustic dampening polyester material, and the inner scrim layer 16 is likewise flexible, and acoustic dampening polyester material. However, the scrim layer 16 is formed with material presenting an inner surface 28 that is smooth in relative comparison to the fibrous material and surface 30 of the outer nonwoven layer 14 to which the scrim layer 16 is attached, and as such, the elongate member 26 is able to slide freely along the inner surface 28 of the scrim layer 16 without getting snagged or otherwise caught on the inner surface 28. Accordingly, not only is the sleeve 10 well suited to protect the elongate members 19 within the cavity 16 against abrasion and damage, but it also inhibits the elongate members 19 from rattling and squeaking, or otherwise producing unwanted noise within the cavity 18, while also being able to assure the elongate member 26, including any electrical connectors thereon, is free from being damage or otherwise compromised, such as by getting snagged, while being installed through the cavity 18.

The sleeve 10 can be constructed having any desired length and various finished thicknesses of the wall 12, as well as varying densities, as desired for the intended application. Further, the cavity 18 can be formed having any suitable diameter to best accommodate the size and configuration of the elongate member 26 disposed therein.

The outer nonwoven layer 14 of the sleeve 10 in FIG. 1, by way of example and without limitation, can be constructed from about 80% standard polyester fibers having about a 3.3 dtex and about 20% low-melt polyester fibers having about a 4.4 dtex, such as bicomponent fibers having a core/sheath construction, wherein the core is a heat-settable polyester, capable of taking on a heat-set configuration, and the sheath is a low melt polyester, capable of being melted and bonded with surrounding material. It should be recognized that one skilled in the art may deviate from these approximate percentages, as needed, to attain the desire physical properties of the sleeve 10. Upon forming a web of the fibers used to form the outer nonwoven layer 14, the web is preferably needlefelted to compact and intertwine the fibers with one another. An outer nonwoven layer 14 constructed in accordance with one embodiment was formed having a weight of about 270 gsm, by way of example and without limitation. Then, upon forming the outer nonwoven layer 14, the scrim layer 16 was bonded thereto. It should be recognized that the scrim layer 16 could be bonded in an in-line, single stage continuous process along with the formation of the nonwoven layer 14, if desired.

The inner scrim layer 16, by way of example and without limitation, can also be constructed including a heat-bondable polymeric material, such as a polyester fibrous material, by way of example and without limitation. The scrim layer 16 can be formed as a flat bond scrim layer or a spun bond scrim layer having basis weight of about 35 gsm, by way of example and without limitation.

The outer nonwoven layer 14 and inner scrim layer 16 are laminated to one another to form the material of the wall 12 via any suitable bonding mechanism, including use of hot melt adhesives or any other suitable adhesive capable of withstanding extreme temperatures, such as those encountered in exhaust pipe applications, by way of example and without limitation. Upon laminating the nonwoven layer 14 to the scrim layer 16, the resulting wall 12 has opposite sides 32, 34 extending lengthwise in generally parallel relation with the longitudinal axis 20, and upon cutting the desired length of the finished sleeve, the wall 12 is provided with opposite ends 22, 24. It should be recognized that the sleeve 10 can first be formed into its generally cylindrical configuration, with the bonded seam 36 having been formed, prior to cutting the sleeve to its finished length. Otherwise, the wall 12 can be first cut to the finished length of the sleeve 10, then wrapped, bonded and trimmed and heat-treated, as desired.

Then, upon forming the desire width of the laminated material, wherein the width is the linear dimension extending between the opposite sides 32, 34, the opposite sides are wrapped about a mandrel to bring the opposite sides 32, 34 into abutment with one another, such as shown in FIGS. 3 and 4, by way of example and without limitation. It should be recognized that the opposite sides 32, 34 could be brought into a butt joint with one another; however, it has been found more efficient to bring the sides 32, 24 into the abutted position as shown in FIGS. 3 and 4, wherein the inner scrim layer 16 is brought into abutment with itself, with the opposite sides 32, 34 extending radially outwardly, thereby forming a radially outwardly extending protrusion. Then, with the sides 32, 34 sandwiched together, the sides 32, 34 are simultaneously trimmed off, generally at 35, and welded to form a bonded seam 36 extending along the length of the wall 12 in parallel relation with the longitudinal axis 20, such as via an ultrasonic welding process, by way of example and without limitation. During the process of forming the bonded seam 36, the materials of both the outer nonwoven layer 14 and the inner scrim layer 16 are fused, coalesced, and welded together, thereby forming a relatively narrow, semi-rigid, bonded plastic material along the bonded spine or seam 36. It should be recognized that during the welding process, the material of the nonwoven layer 14, other than that within the bonded seam 36, remains unmelted. As such, with the material of the nonwoven layer 14 remaining as initially formed and unmelted, upon forming the bonded seam 36, the wall 12 is generally able to collapse radially on itself under its own weight, and accordingly, the wall 12 lacks sufficient strength to remain cylindrical. As mentioned above, at this time, the wall 12 can be cut to its finished length, or other remain as an extension from an upstream, uncurled portion of the wall, if desired.

To provide the wall 12 with the desired resiliency and cylindrical or substantially cylindrical structural form, the circumferentially continuous, bonded wall 12 is disposed over a mandrel of a predetermined size, whether a cylindrical or non-cylindrical mandrel, to bring it into its desired finished configuration, and then the wall 12 is heat-treated at a suitable temperature heat source H for a suitable length of time to at least partially melt the low melt and/or heat-set polyester fibers within the nonwoven layer 14, and then the melted and/or heat-set material is allowed to cool and solidify. Upon heat-treating the wall 12, the wall 12 attains a structural resiliency and rigidity to maintain the cavity 18 having a generally tubular shape, including cylindrical or non-cylindrical, as desired, such that the wall 12 no longer collapses radially on itself, thereby greatly simplifying the installation of the elongate member 26 through the generally cylindrical cavity 18. At this time, if not already performed, the wall 12 could be cut to its finished length. Although maintaining its generally tubular shape, the wall 12 also retains a resiliency that allows the wall 12 to be radially compressed under a radially applied force and then automatically spring back to its generally tubular cylindrical or non-cylindrical form upon releasing the radially applied force, while at the same time remaining sufficiently flexible to allow the wall 12 to be freely routed around corners and over meandering paths.

It is to be understood that other embodiments of the invention which accomplish the same function are incorporated herein within the scope of any ultimately allowed patent claims.

What is claimed is:

1. A nonwoven sleeve for routing and protecting elongate members and providing an acoustic barrier to the elongate members, comprising:
    a tubular wall having opposite lengthwise extending sides bonded to one another along a bonded seam to form a circumferentially enclosed inner cavity extending along a longitudinal axis between opposite ends;
    said tubular wall having an outer nonwoven layer and an inner scrim layer, said inner scrim layer being bonded to an inner surface of said outer nonwoven layer, said bonded seam including melted material of said inner scrim layer;
    wherein said outer nonwoven layer and said inner scrim layer are circumferentially continuous; and
    wherein said bonded seam includes material from said outer nonwoven layer and material from said scrim layer melted and coalesced together.

2. The nonwoven sleeve of claim 1 wherein said tubular wall is flexible and resilient.

3. The nonwoven sleeve of claim 1 wherein said outer nonwoven layer includes heat-set material.

4. A method of constructing a nonwoven sleeve used to route and protect elongate members and to prevent noise generation from the elongate members, the method comprising the steps of:
    forming a circumferentially continuous tubular wall from a lamination of an outer nonwoven layer and an inner scrim layer;
    bonding opposite sides of the wall to one another to bound an inner cavity of the sleeve with the inner scrim layer; and
    further including bonding regions of the outer nonwoven layer and inner scrim layer to one another to form a melted, coalesced, solidified bonded seam extending lengthwise between opposite ends of the sleeve.

5. The method of claim 4 further including heat-setting the outer nonwoven layer by melting at least some fibrous material within the nonwoven layer.

6. The method of claim 5 further including performing the heat-setting by disposing the circumferentially continuous tubular wall about a mandrel and heating the circumferentially continuous tubular wall while on the mandrel.

7. The method of claim 4 further including forming the bonded seam in an ultrasonic welding operation.

8. The method of claim 7 further including trimming off a portion of the opposite sides during the ultrasonic welding operation.

\* \* \* \* \*